United States Patent
O'Neill (10) Patent No.: US 9,947,241 B2
(45) Date of Patent: Apr. 17, 2018

(54) DISPLAY APPARATUS

(71) Applicant: Waterwall Limited, Sheffield (GB)

(72) Inventor: Richard O'Neill, Sheffield (GB)

(73) Assignee: Waterwall Limited, Sheffield (GB)

( * ) Notice: Subject to any disclaimer, the term of this patent is extended or adjusted under 35 U.S.C. 154(b) by 606 days.

(21) Appl. No.: 14/595,245

(22) Filed: Jan. 13, 2015

(65) Prior Publication Data
US 2015/0206454 A1    Jul. 23, 2015

(30) Foreign Application Priority Data

Jan. 21, 2014  (GB) .................................. 1401043.3
Oct. 28, 2014  (GB) .................................. 1419134.0

(51) Int. Cl.
*G09B 25/00* (2006.01)
*G09B 23/12* (2006.01)
*A63G 31/00* (2006.01)

(52) U.S. Cl.
CPC ........... *G09B 23/12* (2013.01); *A63G 31/007* (2013.01); *Y10T 29/49826* (2015.01)

(58) Field of Classification Search
USPC ............... 434/126, 408, 413, 425, 428, 429; 446/71, 75, 168, 176, 487; 40/605, 40/606.1, 607.01, 607.1, 611.05
See application file for complete search history.

(56) References Cited

U.S. PATENT DOCUMENTS

| | | | | |
|---|---|---|---|---|
| 1,567,849 A * | 12/1925 | Kliner | ................... | A63H 33/044 446/110 |
| 2,613,463 A | 10/1952 | Transue | | |
| 3,307,280 A * | 3/1967 | Mazur | ................. | G09F 15/0068 40/124.2 |
| 3,583,090 A * | 6/1971 | Fogarty | .................... | A63H 3/52 108/14 |
| 3,629,960 A * | 12/1971 | Roush | .................... | A47B 41/06 108/27 |
| 4,857,028 A * | 8/1989 | Pail | ......................... | A63J 19/00 446/75 |
| 5,385,472 A * | 1/1995 | Mullin | ................... | G09B 23/12 434/126 |
| 6,056,620 A * | 5/2000 | Tobin | .................... | A63F 7/3622 273/120 R |
| 6,105,292 A * | 8/2000 | Current | ............... | G09F 15/0068 40/605 |
| 6,631,590 B1 * | 10/2003 | Glowaski | ............... | A01K 1/033 135/160 |
| 8,317,565 B2 * | 11/2012 | Shallah | .................... | A63H 3/52 446/153 |

(Continued)

FOREIGN PATENT DOCUMENTS

FR            2555346 A1    5/1985
JP        2003049412 A     2/2003

*Primary Examiner* — Kurt Fernstrom
(74) *Attorney, Agent, or Firm* — James Creighton Wray; Meera P. Narasimhan (57) ABSTRACT

A display apparatus comprising a plurality of planar elements which interconnect to form a display board is described herein. The display apparatus includes a box configured to support the display board in a substantially vertical position. The box is also configured to enable the plurality of planar elements to be packed away inside the box for storage. A method of assembling the display apparatus is also disclosed.

20 Claims, 11 Drawing Sheets

(56) References Cited

U.S. PATENT DOCUMENTS

| | | | | |
|---|---|---|---|---|
| 8,549,779 | B2* | 10/2013 | Ceurvels | G09F 15/0068 |
| | | | | 160/113 |
| 8,568,188 | B2* | 10/2013 | Horowitz | A63F 7/3622 |
| | | | | 273/120 R |
| 8,770,114 | B2* | 7/2014 | Kiskis | A47B 41/00 |
| | | | | 108/50.11 |
| 2007/0079561 | A1* | 4/2007 | Hopkins | A47F 5/0846 |
| | | | | 52/36.5 |
| 2007/0128969 | A1* | 6/2007 | Shrock | A63H 23/10 |
| | | | | 446/153 |
| 2008/0200095 | A1* | 8/2008 | Guenette | A63H 33/16 |
| | | | | 446/488 |
| 2010/0043265 | A1* | 2/2010 | Amrani | G09F 7/22 |
| | | | | 40/607.07 |
| 2011/0070803 | A1* | 3/2011 | Hoffman | A63F 7/3622 |
| | | | | 446/168 |
| 2012/0275087 | A1* | 11/2012 | Corey | A47B 91/005 |
| | | | | 361/679.01 |
| 2013/0271940 | A1* | 10/2013 | Cope | H05K 7/14 |
| | | | | 361/809 |
| 2015/0056600 | A1* | 2/2015 | Melashenko | G09B 19/00 |
| | | | | 434/428 |
| 2015/0364062 | A1* | 12/2015 | Spandl | G09B 25/02 |
| | | | | 434/429 |

* cited by examiner

DISPLAY APPARATUS

CROSS REFERENCE TO RELATED APPLICATIONS

This application claims priority from United Kingdom Patent Application No. 14 01 043.3, filed 21 Jan. 2014 and United Kingdom Patent Application No. 14 19 134.0 filed 28 Oct. 2014, the entire disclosures of which are incorporated herein by reference in its entirety.

BACKGROUND OF THE INVENTION

1. Field of the Invention

The present invention relates to display apparatus for displaying moveable display elements on a board, the box in which the display board is stored being additionally configured to support the display board in use.

2. Description of the Related Art

It is known that it is educationally beneficial for children of all ages to play with substances such as water and sand. For very young children it helps them understand basic cause and effect, while for older children it helps with physical concepts such as gravity and flow.

However, water tables and sand tables are bulky to store, and often do not provide any configurable elements. Thus, they tend to be suitable for only one age group and to provide an incomplete learning experience, as children cannot experiment with changing the flow of the water or sand.

BRIEF SUMMARY OF THE INVENTION

According to a first aspect of the present invention there is provided display apparatus according to claim 1.

According to a second aspect of the invention there is provided a display element according to claim 27.

According to a third aspect of the invention there is provided a method of assembling a display board according to claim 28.

According to a fourth aspect of the invention there is provided a method of manufacturing display apparatus according to claim 29.

DETAILED DESCRIPTION OF EXAMPLE EMBODIMENTS

Figure 1:
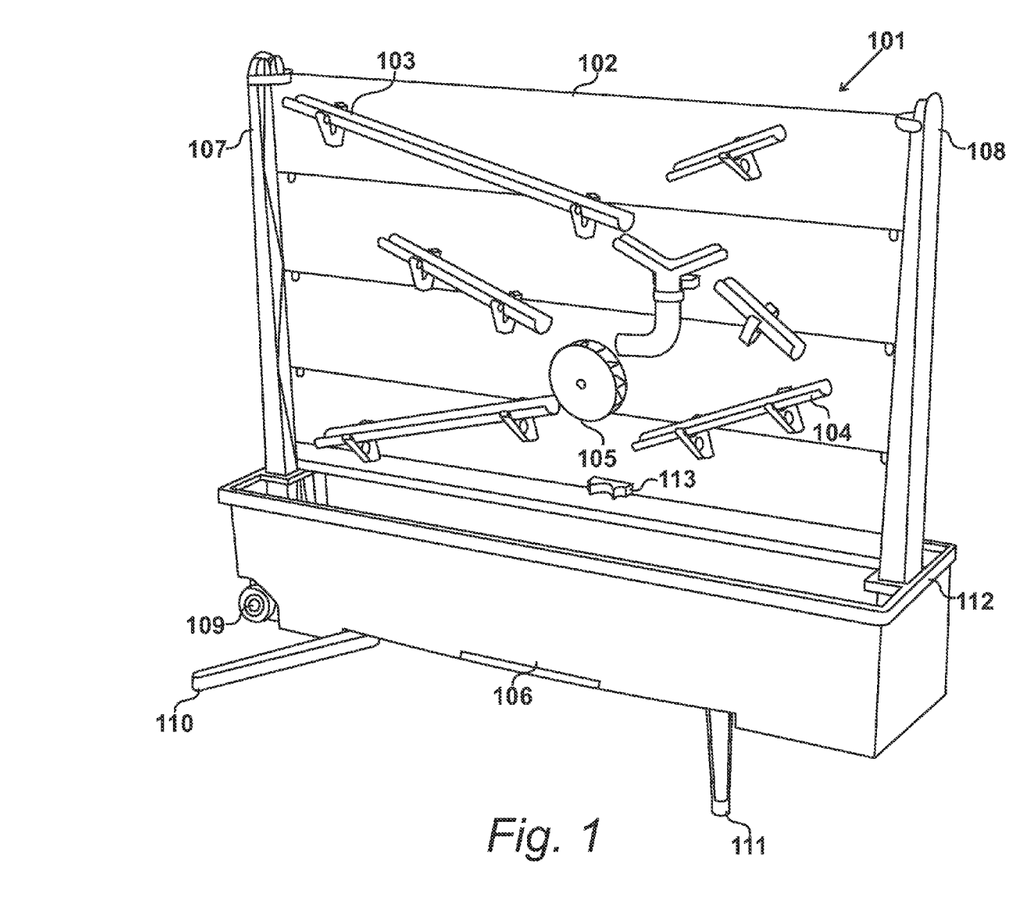
FIG. 1 shows a first embodiment of the display apparatus.

FIG. 1

FIG. 1 illustrates a first embodiment of the invention. Display apparatus 101 provides a display board 102 upon which moveable display elements, such as gutter 103, gutter 104 and wheel 105 are displayed. Board 102 is supported by box 106, and posts 107 and 108. Box 106 comprises two wheels, of which wheel 109 is shown, and four stands, of which stands 110 and 111 are shown.

Display apparatus 101 provides a configurable water-play or sand-play system. Each of the display elements, such as display elements 103, 104 and 105, is magnetically attached to display board 102, although other methods of moveably attaching the elements are envisaged. Thus the apparatus may be set up in advance by a teacher or parent for a child to explore, or an older child may be presented with the display elements and asked to solve a problem. The elements may be placed at a suitable height for a young child, or the whole height of the apparatus may be used by a taller child. Many display elements or a small number may be used as desired, and the end result may be complex or simple depending on the needs and abilities of the child.

In this example, the magnetic attachment of the display elements allows each display element to be placed freely on board 102. Other methods of moveably attaching display elements are envisaged, including ones in which less freedom of placement is allowed, for example the display elements clipping into predrilled holes. However, methods that allow more freedom of placement are preferred.

In use, once the display elements are placed on board 102, water or sand is introduced to one of the elements and the child observes how it runs down the elements and how it interacts with them. The water or sand collects in box 106, from where it can be scooped up and used again. Additionally, a collecting receptacle can be placed in a display element such as element 113, which is designed to hold such a receptacle. Since box 106 supports board 102, it can not be accidentally or deliberately moved from under the board, thus minimizing the chance of the water or sand getting on the floor. In further embodiments, any suitable flowing material is used as an alternative to water or sand, such as rice, pebbles, balls or marbles.

Stands 110 and 111, and a further two stands (not shown) on the other side of box 106, are rotatably attached to the base of 106 so that they can be folded out to provide support for display apparatus 101 in use, and folded under box 106 when not in use to minimize storage space. In order to prevent accidental or deliberate moving of the stands, they may be lockable into their supporting positions.

Wheel 109 and another wheel (not shown) on the other side of box 106 facilitate the easy movement of display apparatus 101, by a user picking up the opposing end 112 of box 106 and wheeling the apparatus for a short distance.

Figure 2:
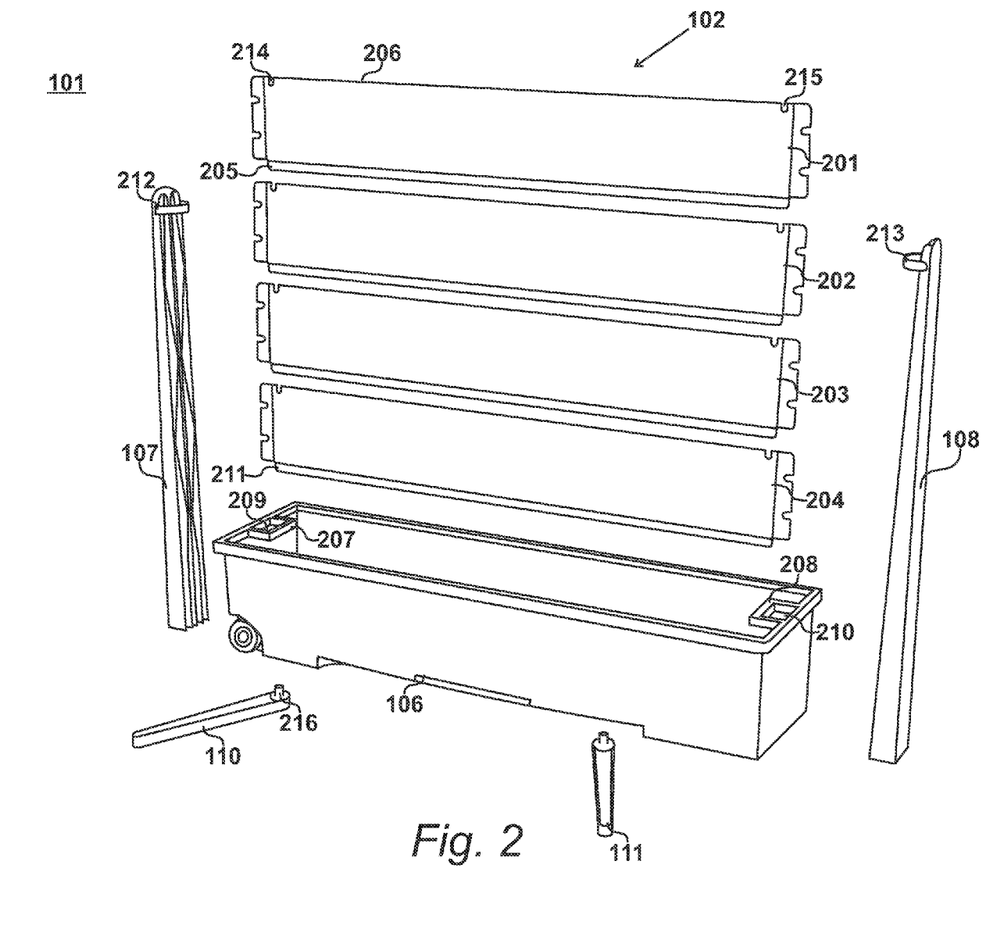
FIG. 2 illustrates the display apparatus of FIG. 1 exploded into its constituent parts.

FIG. 2

FIG. 2 shows display apparatus 101 exploded into its constituent parts, not including the display elements.

Display board 102 is made up of four planar elements 201, 202, 203 and 204. Each of the elements 201 to 204 is substantially identical, and is formed with a tongue on one long edge, such as tongue 205 of planar element 201, and a groove on its opposing edge, such as groove 206 of planar element 201. Thus, the planar elements interconnect using a tongue and groove method.

Alternative interconnection methods are possible, including ones where the planar elements are connected, for example by elastic thread, even when not interconnected.

Box 106 has an internal lip 207 at one end and an internal lip 208 at the opposing end. Each lip defines an aperture configured to receive one of the posts. Thus in use post 107 is placed through aperture 209 in lip 207, and post 108 is placed through aperture 210 in lip 208. The bottoms of the posts are placed on the base of the box. In an embodiment, lips 207 and 208 extend from their respective apertures 209 and 210 to the base of the box in the form of a pocket.

In use, the tongue 211 of bottom-most planar element 204 sits on lips 207 and 208 of box 106. Each end of each planar element is supported within one of posts 107 and 108. Post 107 is provided with a rotatable catch 212 and post 108 is similarly provided with a rotatable catch 213. Each planar element is provided with a small recess on each end, such as recesses 214 and 215 of planar element 201. Rotatable catches 212 and 213 are rotated upwards to be out of the way while the display apparatus is being assembled, and are rotated down to catch in their respective recesses when assembly is complete. Thus catch 212 slots into recess 214 and catch 213 slots into recess 215. Once the catches are in place, the planar elements can no longer be removed from posts 107 and 108.

Thus, when the components shown in FIG. 2 are assembled as shown in FIG. 1, the display apparatus is sturdy and the component pieces cannot be disassembled until rotatable catches 212 and 213 are moved into their vertical position. Since these catches cannot be reached by a small child, this assembly method provides an advantage over other methods that may have catches at a lower level. In addition, this method requires no removeable fixing elements, such as screws, that might get lost. However, other methods of construction are envisaged, in particular, methods that do not require the use of posts 107 and 108. In such methods additional fixing would be needed for the planar elements, and display board 102 would sit deeper within box 106.

In the embodiment herein described, each of the planar elements 201 to 204 is magnetically receptive on both sides. This enables both sides of the board to be used simultaneously. However, in other embodiments only one side might be magnetically receptive, allowing the other side to have another function or to remain unused. In an alternative embodiment, the planar elements 201 to 204 are magnetic as opposed to magnetically receptive so as to be able to receive magnetically receptive display elements.

In this example, each planar element is formed from an inner support layer of foam board, five millimeters in thickness, although other base layers such as honeycomb foam or some other lightweight material may be used. A layer of steel is attached to each side, and the entire planar element is encased in plastic to make it waterproof. In this example embodiment, the layer of steel is 0.6 millimeters in thickness, however in a further embodiment, the layer of steel is 0.2 millimeters thick. In one embodiment the plastic may be of the type suitable to be erasably written on using a whiteboard marker. Thus the board may be used as a whiteboard in addition to supporting display elements. Alternatively, the steel and plastic layers could be replaced by a layer of magnetically receptive PVC, or some other suitable material. In other embodiments, where the method of moveably attaching display elements is different, the construction of the planar elements would be of a type suitable for that purpose. In a particular embodiment, the planar elements are manufactured as a box section and include a hollow centre.

Planar elements 201 to 204 may include illustrations and include a pre-printed layer to provide a suitable background for the display board. For example, backgrounds showing photographs or logos may be used, but in other embodiments the planar elements may be provided with scales and lines to allow measurements or recordal of results or other educational illustrations which are interactive with the display elements.

Stands 110 and 111 are shown detached in FIG. 2, to illustrate their method of attachment. For example, stand 110 comprises a nub 216 which is inserted into a corresponding aperture in the base of box 106. The other stands are attached similarly. In normal use the stands would not be removed from the box. It is appreciated that in some uses, such as when box 106 is filled with water, stands 110 and 111 may not be required.

Figure 3:
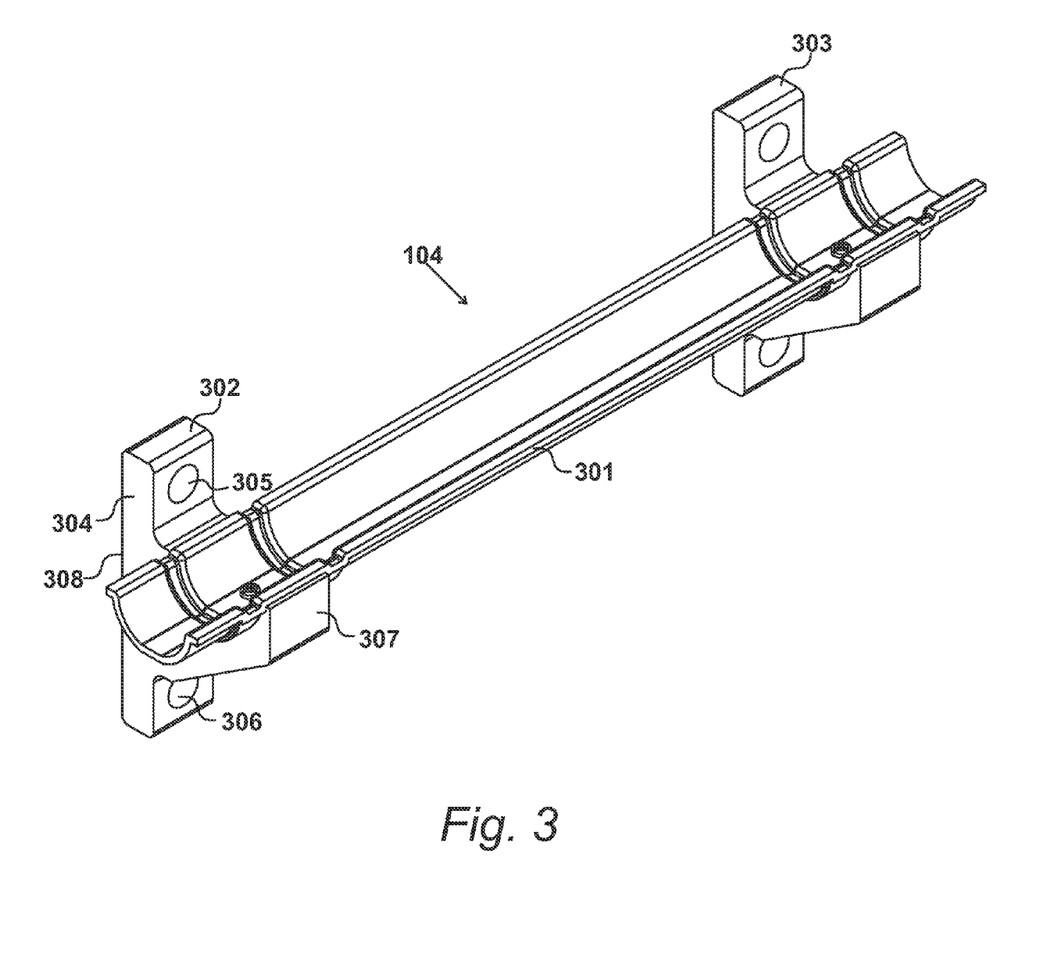
FIG. 3 illustrates a moveable gutter shown in FIG. 1.

FIG. 3

FIG. 3 illustrates display element 104. It comprises a gutter 301 and two clips 302 and 303. Clips 302 and 303 are examples of supporting elements and gutter 301 is an example of a supported element. In this embodiment, each display element is made up of at least one supported element and at least one supporting element.

Clip 302 comprises a back 304 into which a first magnet 305 and a second magnet 306 are set. It also comprises a rest 307, integral with back 304. Rest 307 is of a similar cross-sectional shape to gutter 301, and is therefore configured to receive the base of gutter 301. Back 304 provides a flat rear surface 308 for clip 302, configured to abut display board 102. Clip 303 is substantially identical to clip 302.

Clip 302 is designed such that a similar clip may be used in each of the display elements shown in FIG. 1. Some pieces of guttering may be short enough to only require a single clip, while longer ones may require more. The size and strength of the magnets in the clips are chosen so that each display element magnetically attaches to display board 102 without being too heavy for a child to lift.

In the present embodiment, gutter 301 and clips 302 and 303 are each molded from a suitable plastic. In an alternative embodiment, clips 302 and 303 are machined from a suitable plastic.

In this embodiment, the distance between the rear surface 308 of clip 302 and the lowest point of gutter 301 is fifty millimeters. This provides a "drip line" such that the water or sand flowing through the gutters is generally not in contact with the display board, but the gutters are not so far from the board that the display elements are unbalanced or too heavy.

Figure 4:
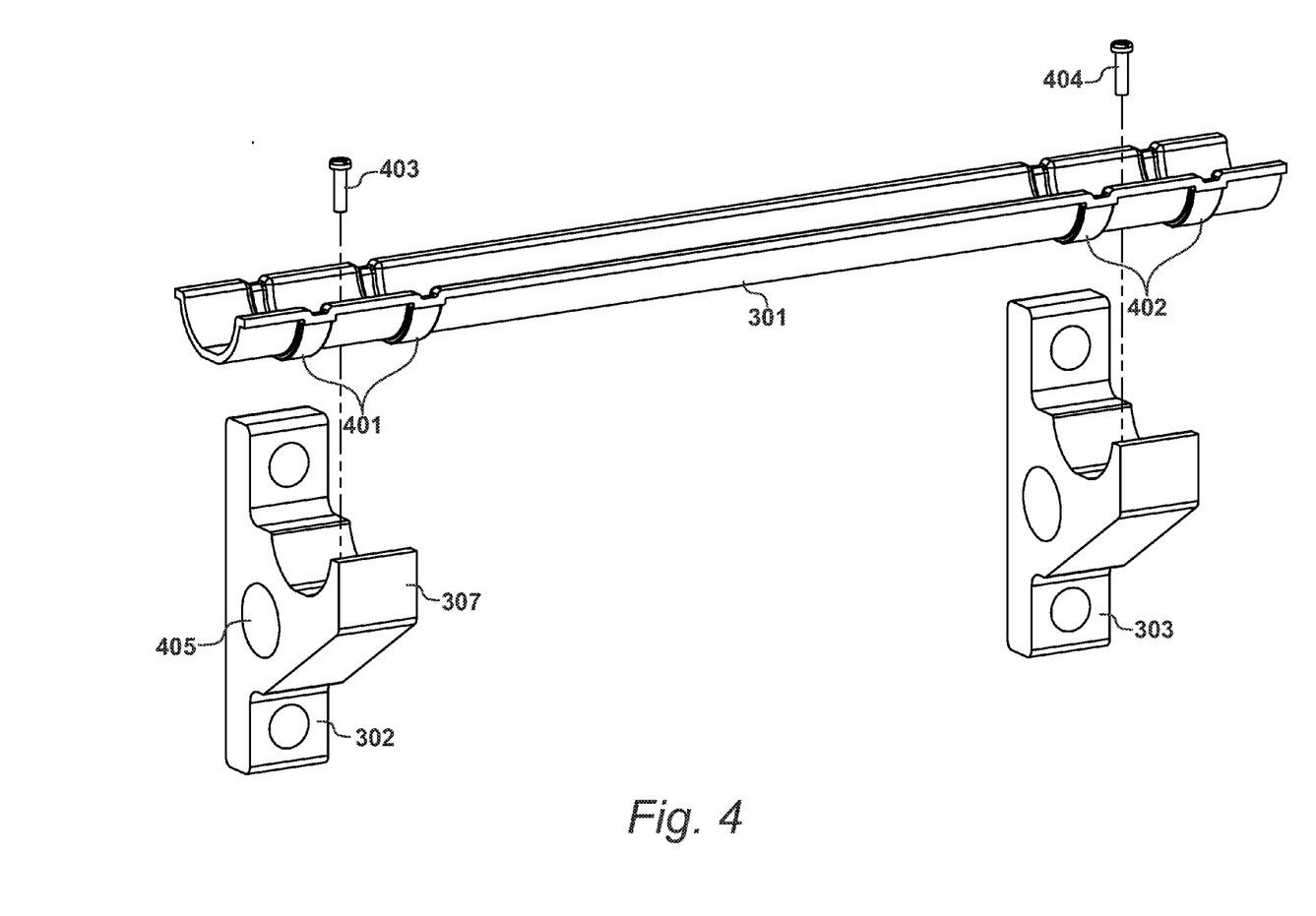
FIG. 4 illustrates the gutter shown in FIG. 3 exploded into its constituent parts.

FIG. 4

The construction of display element 104 is shown in FIG. 4. Gutter 301 includes two pairs of ribs 401 and 402. The distance between each pair of ribs is substantially equal to the width of rest 307 of clip 302, such that gutter 301 locates in place over its required number of clips. The gutter is then secured to each clip using screws 403 and 404. In this example the screws are made of polycarbonate.

Thus in normal use display element 104 is integrally formed from supporting elements, provided by clips 302 and 303, and a supported element, provided by gutter 301. In normal use, display element 104 is a single element that would not be disassembled either during use or for storage. However, the elements are removeably attached to each other using screws 403 and 404, meaning that if one of the clips or the gutter needs replacing this can be easily done.

In FIG. 4 it can be seen that clip 302 is formed with an aperture 405 and clip 303 is similar. These apertures are configured to receive a user's fingers, to facilitate placing display element 104 on board 102 and removing it. A user can, however, pull on gutter 301 to remove display element 104 from board 102 without use of the apertures if required. Use of the apertures, however, can reduce stress on gutter 301 and screws 403 and 404 and so use of the apertures may be encouraged to avoid breakages. However, the gutter itself should be strong enough to withstand being moved around and pulled from the board without the use of apertures.

Aperture 405 may also be used to support cables, wires or tubes, which can be threaded through one or more apertures in the display elements in order to keep the board tidy. Aperture 405 may also be used to support tubes or pipes as part of a closed water system, so that, for example, when a pump is installed in the system, a flow of recycled water can be displayed.

In other embodiments, the supporting elements and supported elements may be separate in normal use, allowing users to place the supporting elements on the board and then place the supported elements on them as required.

Figure 5A:
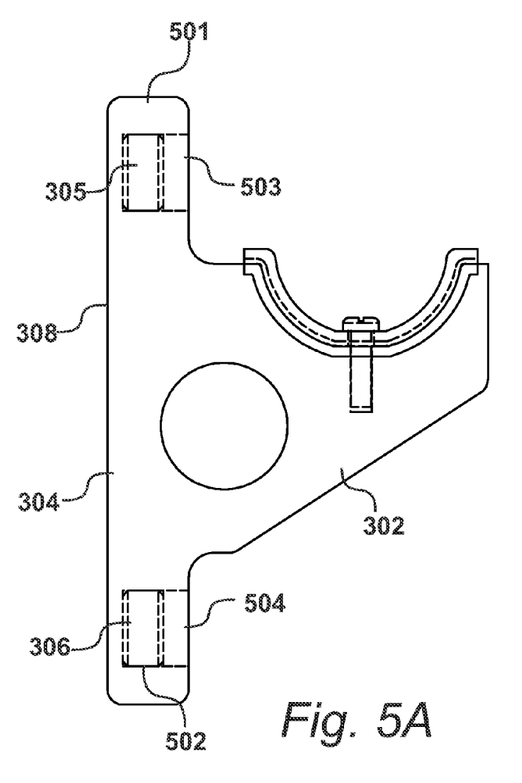
FIG. 5A is a cross-section through clip 302 of display element.
Figure 5B:
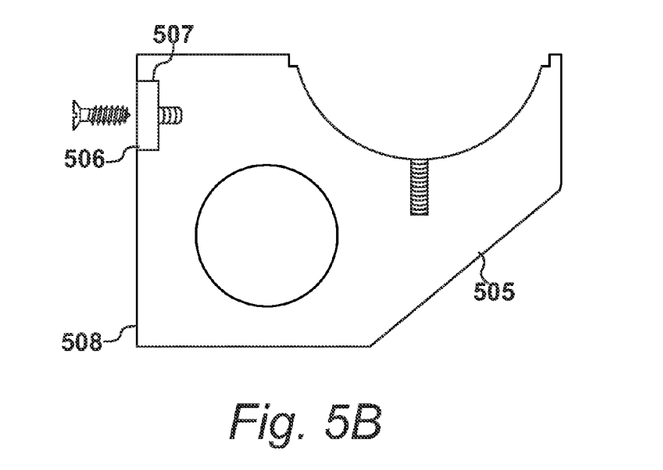
FIG. 5B shows a clip 505 formed without plugs and one or more magnets 506 screwed into recess 507 so that the outer magnet is flush with the back 508 of the clip.

FIG. 5

FIG. 5A is a cross-section through clip 302 of display element 104. In this Figure it can be seen how magnets 305 and 306 are placed within recesses 501 and 502 respectively formed within the back 304 of clip 302. In order for clip 302 to be waterproof, the recess is closed at the back, such that surface 308 is uninterrupted. Plugs 503 and 504 are friction fitted on top of the magnets within recesses 501 and 502 respectively.

Each of magnets 305 and 306 may be formed from a plurality of smaller magnets.

Alternatively, FIG. 5B shows a clip 505 formed without plugs and one or more magnets 506 screwed into recess 507 so that the outer magnet is flush with the back 508 of the clip. In this case, the magnets must be coated so that they are not in direct contact with a person or the display board when in use. They may be coated with plastic, or with a nano-coating. The nano-coating is preferred as it is thin, which enables smaller magnets to be used and the whole display element to be lighter. In the embodiment shown, a single magnet 506 is used which leads to a different shaped clip to that of FIG. 5A. However, in an alternative embodiment, two magnets may be used and positioned in a similar manner to that as shown in FIG. 5A.

Figure 6:
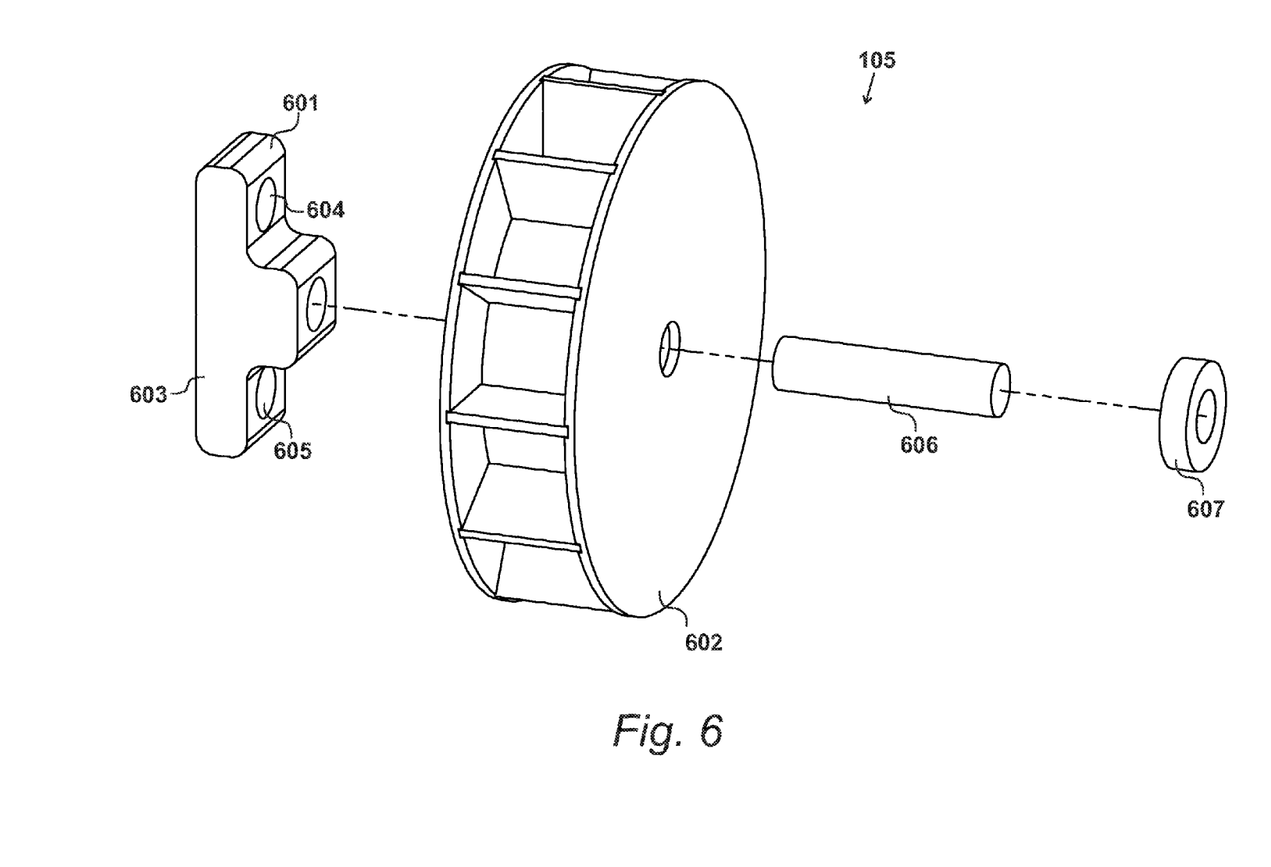
FIG. 6 illustrates a moveable waterwheel shown in FIG. 1.

FIG. 6

FIG. 6 illustrates a different display element, waterwheel 105. It is shown exploded into its constituent parts. Display element 105 includes a single supporting element provided by clip 601 and a supported element provided by waterwheel 602. Similarly to clip 302, clip 601 includes a back 603 into which magnets 604 and 605 are set. Wheel 602 is rotatably attached to clip 601 using axle 606 and nut 607. Like display element 104, display element 105 is designed to be used as a single piece, but may be disassembled for repair or replacement of its constituent parts. Clip 601, wheel 602, axle 606 and nut 607 are all molded from a suitable plastic. The waterwheel as constructed is suitable for either sand or water play or other flowable material such as rice, pebbles, balls or marbles for example.

The display elements described herein are only examples of display elements that may be used in display apparatus 101. There are many more types of element that could be used for water and sand play, such as tubes, collecting reservoirs, weighted levers, and so on. However, in addition, the display apparatus described is suitable to be used with many other types of display elements that can be moveably attached to the board. For example, the display elements could be electrical components configured to be connected by wires, enabling an interactive learning about electricity. The display elements could be pieces of a jigsaw or other puzzle to be solved. The display elements could be plastic frames configured to display artwork. Thus it will be appreciated that many different types of display elements can be used. In addition, in this embodiment display board 102 provides a whiteboard surface; thus it may be simply used as a whiteboard without using any display elements at all.

Figure 7:
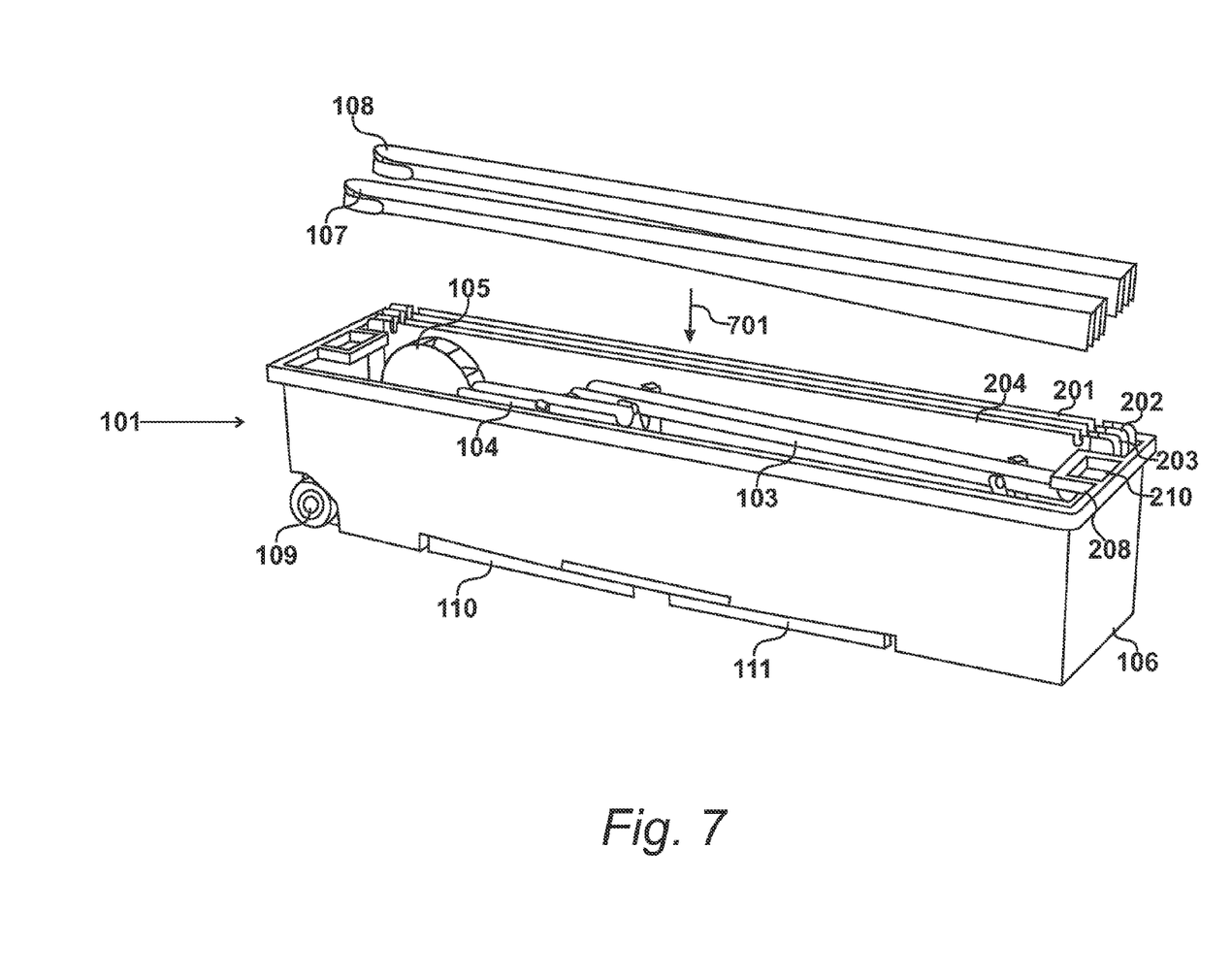
FIG. 7 shows the display apparatus of FIG. 1 packed away for storage.

FIG. 7

FIG. 7 illustrates how display apparatus 101 is packed away for storage. A disadvantage of many display boards and of sand- and water-play tables is that they take up space when not in use. In addition, they may be difficult to move, for example between classrooms. Also, the display items need to be stored somewhere and it is easy to mislay such items.

The display apparatus described herein provides a solution to this problem. Box 106 is configured such that all the other components of display apparatus 101 may be packed away within it, as shown in FIG. 7. Planar elements 201 to 204 are placed vertically side by side within box 106, and the display elements are placed alongside them (display elements 103, 104 and 105 are shown). Posts 107 and 108 are then placed on top, as illustrated by arrow 701. The stands, such as stands 110 and 111, are folded away under box 106, and aperture 210 in lip 208 provides an handle by which the whole box may be picked up by a user and moved using the wheels, such as wheel 109. A lid may also be provided (not shown).

Thus there is provided display apparatus wherein the box that supports the display board is further configured such that all the elements of a display apparatus may be packed away inside it for storage. Using this method, the pieces are stored together in a compact manner and the entire apparatus may be easily moved between locations.

Figure 8:
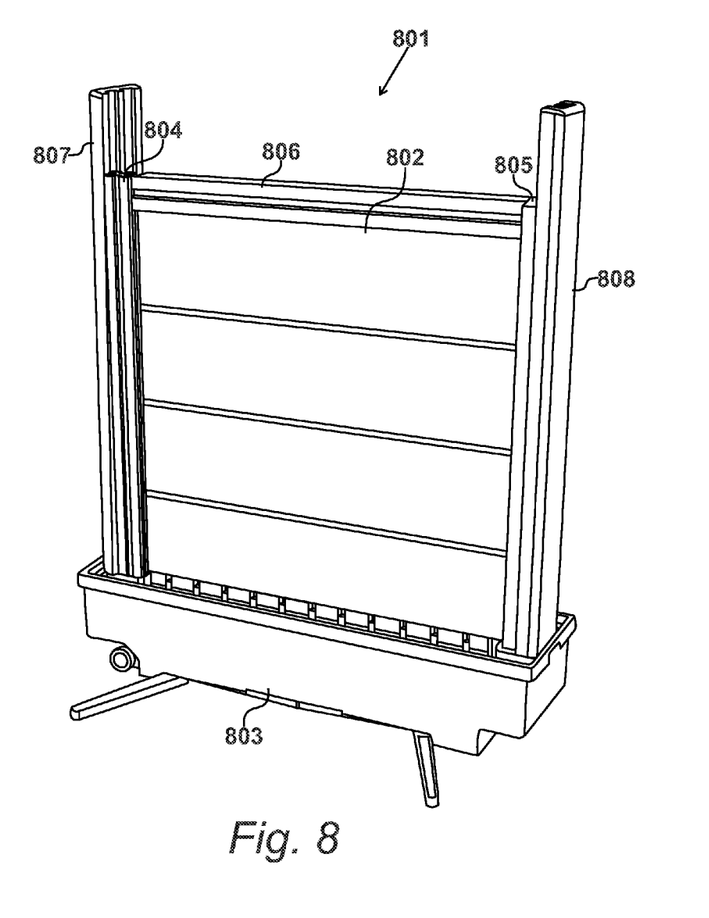
FIG. 8 shows a second embodiment of the display apparatus.

FIG. 8

FIG. 8 illustrates a second embodiment of the invention. Display apparatus 801 provides a display board 802 upon which moveable display elements can be displayed. The display elements may be any previously described. Board 802 is supported by box 803, posts 804 and 805, and top post 806. Posts 804 to 806 may be formed of plastic or aluminum, and if plastic may have a metal spine. Any material that is strong enough to provide the required structure while not being too heavy for a person to lift may be used. Splash guards 807 and 808 provide splash protection and also form the lid to box 803.

Display board 802 is, in this example, substantially identical to display board 102, but may also be any of the alternatives described above with respect to FIG. 2.

Figure 9:
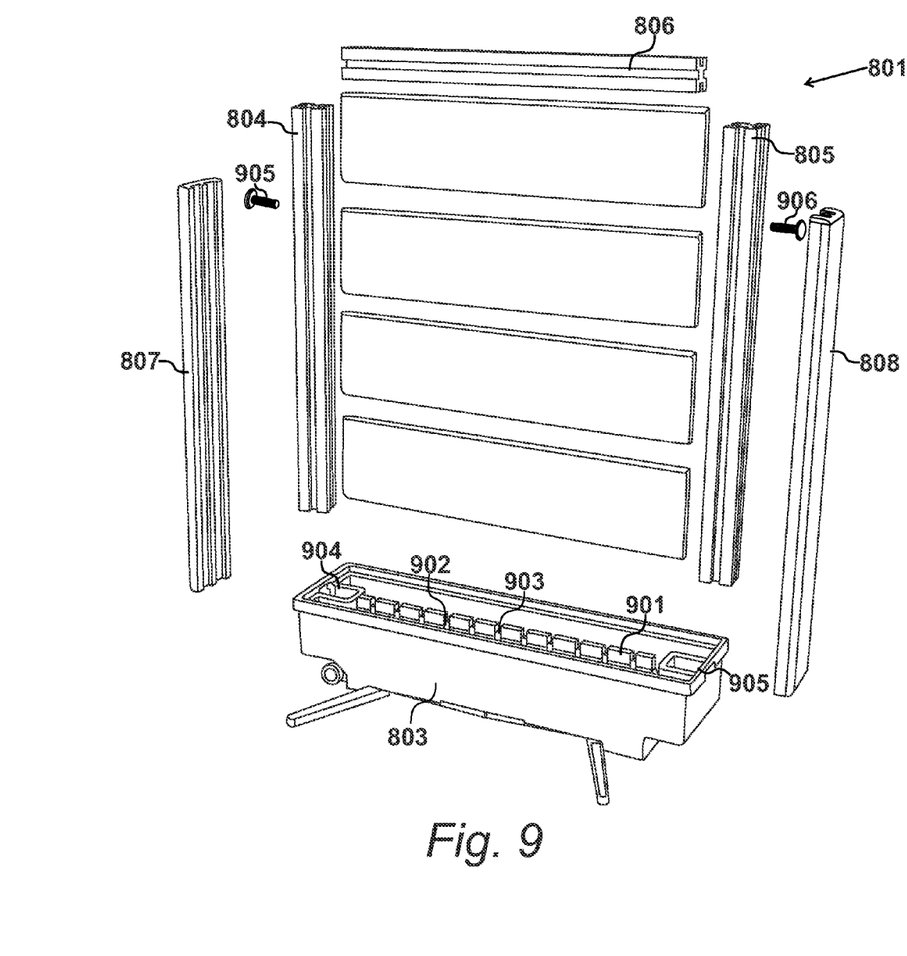
FIG. 9 illustrates the display apparatus of FIG. 8 exploded into its constituent parts.

FIG. 9

FIG. 9 shows display apparatus 801 exploded into its constituent parts. Box 803 comprises an internal baffle 901 with sloping sides, which can be seen more clearly in FIGS. 10 and 11. The baffle prevents children from placing their heads, arms etc underneath the display board and potentially becoming trapped. In addition, the baffle is ribbed to allow the display elements to be removeably attached to it, for ease of storage (described further with reference to FIG. 10). In use, the display board sits on top of baffle 901, and grooves in the top of the baffle, such as grooves 902 and 903, allow water to pass underneath the board. In addition these grooves may be used as fixing points for display elements, such as receptacles to collect the water or sand, pulleys, and so on.

Figure 11:
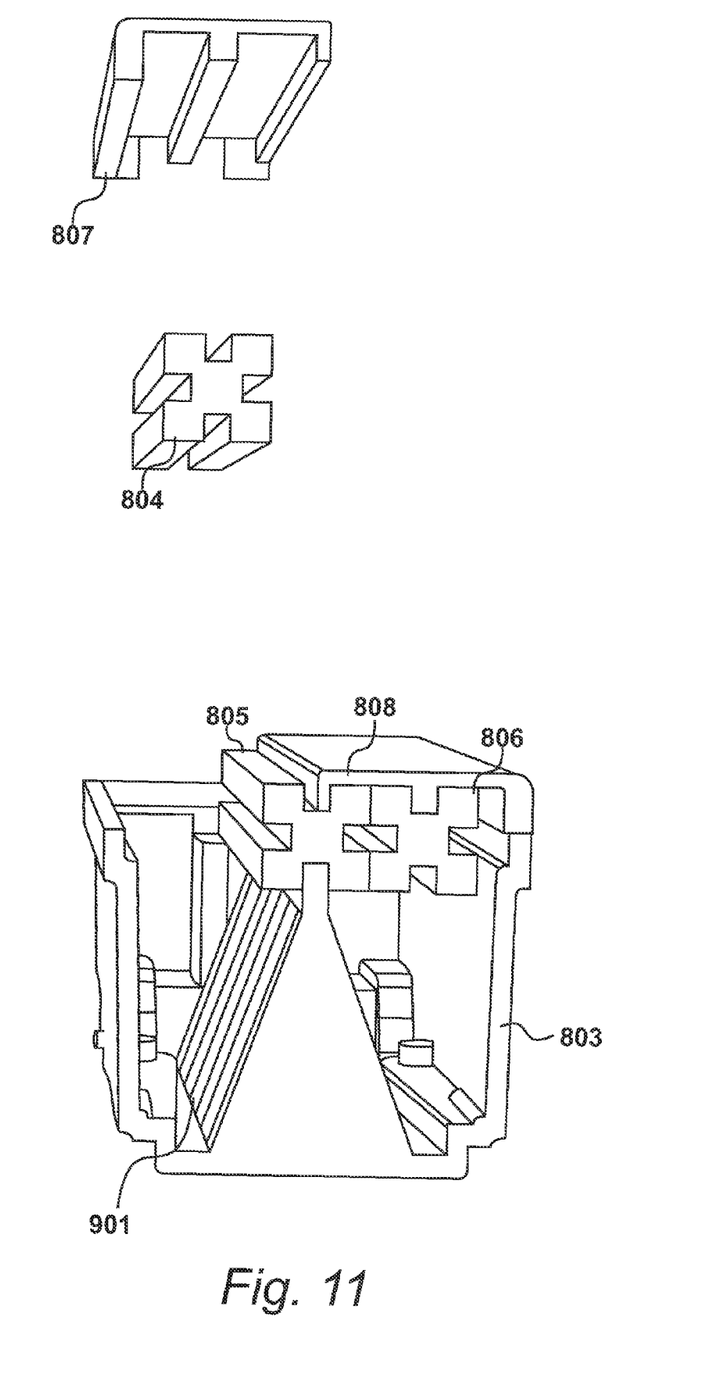
FIG. 11 is an illustration of the internal view of the box shown in FIG. 8.

Each of posts 804, 805 and 806 is shaped similarly, having a square cross-section with a channel on each side (as can be seen more clearly in FIG. 11). In use, posts 804 and 805 slot into apertures 904 and 905 respectively in box 803. Display board 802 then slots into a channel on each post. Top post 806 slots over the top of display board 802. The apparatus is then held in place by screws 905 and 906, which screw through posts 804 and 805 respectively into the respective ends of post 806. In this way, the respective ends of post 806 each include a threaded boss insert into which screws 905 and 906 are inserted. When screwed together, posts 804, 805 and 806 hold display board 802 in place as well as locking together any planar elements making up the display board.

Top post 806 provides additional stability for apparatus 802, and also provides a fixing channel for display elements such as water holders, pulleys, etc. Similarly, posts 804 and 805 also provide fixing channels so as to attach further display elements thereto.

The splash guards 807 and 808 may then optionally be fitted to posts 804 and 805 respectively. Two display apparatus may be fitted together to form a longer apparatus, by using a connecting element (not shown) between adjacent posts. Similarly, two display apparatus may also be fitted together to form a display board at substantially right angles to each other using an alternative connecting element between adjacent posts so as to create, for example, a corner display.

The post construction shown in this embodiment may be used with the box of the first embodiment, and similarly the post construction of the first embodiment may be used with the box of this embodiment.

Figure 10:
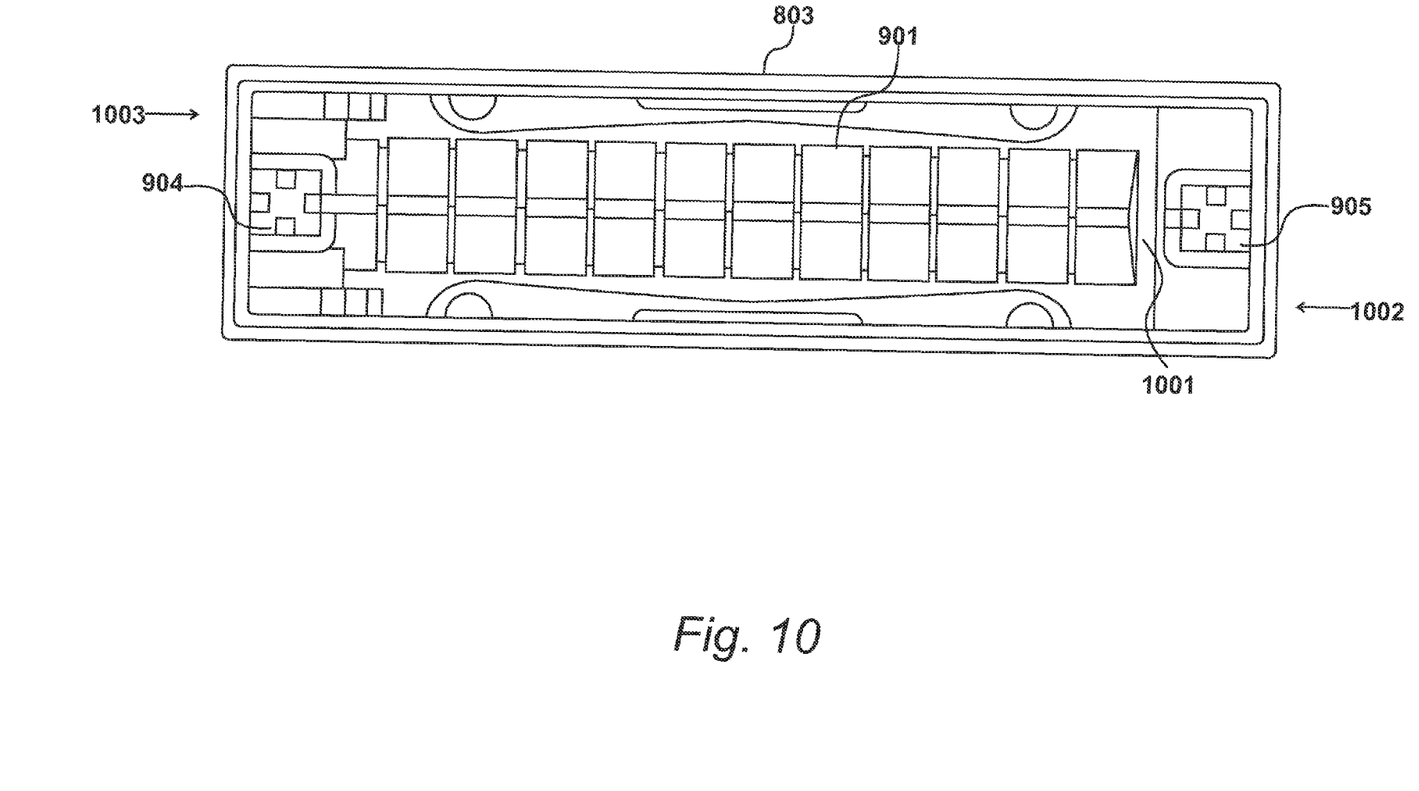
FIG. 10 is a plan view of the box shown in FIG. 8.

FIG. 10

A top view of box 803 is shown in FIG. 10. The internal baffle 901 is shown, which is ribbed. Baffle 901 extends from the left-most post aperture 904 almost until right-most post aperture 905. A channel 1001 is provided between baffle 901 and aperture 905, to allow water to flow freely between the two sides of the box; this prevents the box becoming unequally loaded when only one side of the display board is used. However, in other embodiments channel 1001 may not be provided.

Apertures 904 and 905 are shaped to receive posts 804 and 805, but could be shaped to receive alternative post embodiments.

When the apparatus is packed away, the planar elements comprising display board 802 slot down the sides of box 803, and the display elements attach to the sides of baffle 901. The ribs in baffle 901 are spaced by a factor of the distance between the magnetic clips on the display elements, and the grooves between the ribs are the same width as the clips, so that the clips can slot into the grooves. For example, in this embodiment the ribs are spaced ten centimeters apart, and each display element that has more than one clip has them spaced at a multiple of ten centimeters. In this embodiment the grooves are shaped to be slightly larger at the rear than at the front, so that the magnets push fit into place, although other methods of attachment are envisaged.

Although not shown in this drawing, box 803 has a hose connection at the handle end 1002, near the top, which can be used to fill the box with water. When the hose is no longer connected, the connection acts as an overflow. A sump is provided at the wheel end 1003 of the box, so that the box can be easily drained by lifting it at the handle end. A hose fitting to drain the water away may be provided at the sump.

FIG. 11

FIG. 11 illustrates box 803 with the end cut away to show baffle 901. In this figure the sloping sides of the baffle can be seen, which provide rigidity to box 803.

As can be seen in this figure, posts 804 to 806 slot into the two sections 807 and 808 of the lid (which serve the dual function of splashguards). Posts 804 and 806 may also locate into a nub molded into box 803 which enable posts 804 and 806 to be positioned at a set height before the lid sections 807 and 808 are slotted onto posts 804 and 806. Similarly, post 805 slots onto baffle 901 such that sections 807 and 808 can be slotted onto the posts.

Each of sections 807 and 808 is formed with a concave cross section, having a tongue running its length. Each tongue push fits into the channel of one of the posts, and the edges of the sections push fit together into the third post. Thus, the three posts 804, 805 and 806 can all be placed into box 803 and are automatically positioned to accommodate sections 807 and 808 such that the sections close the box together. Thus post 805 holds the sections together to form a lid, and the posts are held in place and prevented from falling onto the display elements stored within the box (not shown in this figure).

The invention claimed is:

1. Display apparatus, comprising:
   a plurality of planar elements, wherein said elements interconnect to form a display board; and
   a box configured to support said display board in a substantially vertical position;
   wherein said box is further configured such that said plurality of planar elements may be packed away inside said box for storage; and
   said box comprises an internal baffle with sloping sides.

2. Display apparatus according to claim 1, further comprising two support posts configured to attach to said box and to provide additional support to said display board.

3. Display apparatus according to claim 2, wherein said box is configured such that said posts may be additionally packed away inside said box for storage.

4. Display apparatus according to claim 1, further comprising a plurality of display elements for moveably attaching to said board, wherein said box is configured such that said display elements may be additionally packed away inside said box for storage.

5. Display apparatus according to claim 1, wherein at least one side of said baffle is ribbed such that said display elements can be removably attached to said baffle.

6. Display apparatus according to claim 2, further including a lid configured to provide a cover for said box, and wherein said lid is configured such that said posts can be removably attached to the underside of said lid.

7. Display apparatus according to claim 4, wherein each of said display elements attaches magnetically to said display board.

8. Display apparatus according to claim 4, wherein each of said display elements comprises at least one supporting element and at least one supported element.

9. Display apparatus according to claim 8, wherein each of said supporting elements comprises at least one magnet.

10. Display apparatus according to claim 9, wherein each of said supporting elements is configured such that said magnet is enclosed by said supporting element.

11. Display apparatus according to claim 1, wherein each of said planar elements is formed from a support layer and a layer of steel.

12. Display apparatus according to claim 1, wherein each of said planar elements is formed from a support layer and a layer of magnetically receptive PVC.

13. Display apparatus according to claim 1, wherein said box includes at least one stand, each stand being rotatably attached to the base of said box.

14. Display apparatus according to claim 4, wherein said display elements are configured to carry a flowable material.

15. Display apparatus according to claim 14, wherein said flowable material is water or sand.

16. Display apparatus according to claim 15, wherein said box is configured to act as a reservoir for said water or sand.

17. Display apparatus according to claim 1, wherein said planar elements are formed with a tongue on one side and a groove on the opposing side, such that they interconnect using a tongue-and-groove method.

18. A display element suitable for use with a display apparatus as claimed in claim 1, comprising at least one supporting element and at least one supported element, said supported element being removably attached to said supporting element, and said supporting element having a substantially flat rear face, wherein the distance between said rear face and the lowest point of the supported element is substantially 50 mm.

19. A method of assembling a display board, comprising the steps of:
  unpacking a plurality of planar elements from a box;
  interconnecting said planar elements to form a display board; and
  placing said display board on said box such that it is supported by said box in a substantially upright position; wherein
  said box is formed with an internal baffle with sloping sides.

20. A method of manufacturing display apparatus, comprising the steps of:
  constructing a plurality of planar elements that interconnect to form a display board;
  constructing a box suitable for both supporting said display board and for containing said planar elements; and
  constructing an internal baffle with sloping sides to form part of said box.

* * * * *